Patented Mar. 28, 1950

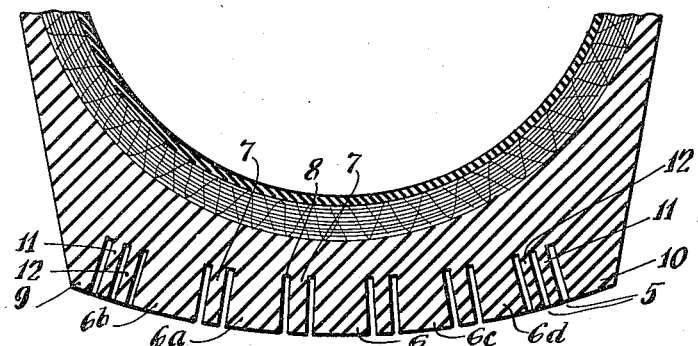
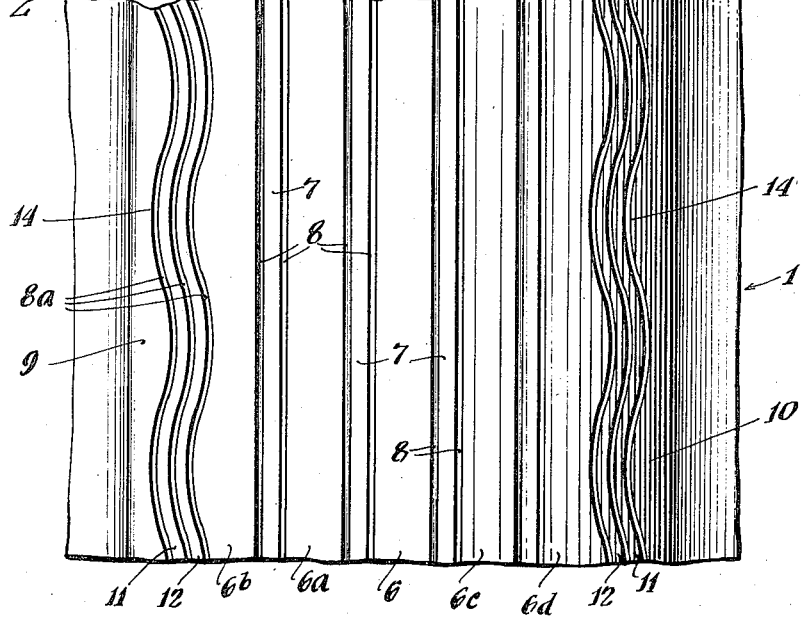
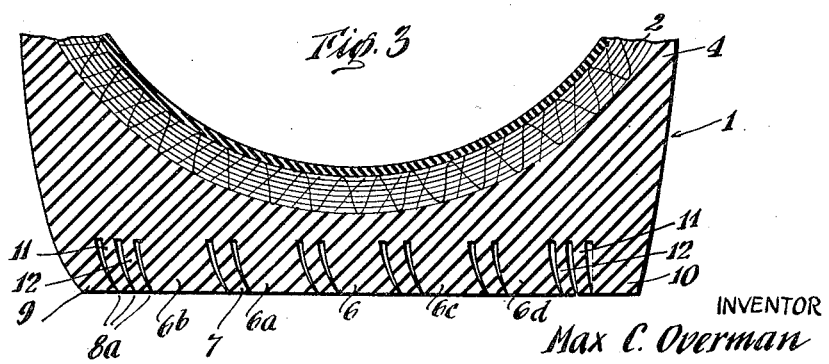

2,501,828

UNITED STATES PATENT OFFICE 2,501,828

PNEUMATIC TIRE TREAD

Max C. Overman, New York, N. Y., assignor of two-thirds to Herbert C. Smyth, Jr., New York, N. Y.

Application December 1, 1945, Serial No. 632,201

8 Claims. (Cl. 152—209)

The present invention relates to pneumatic tires and more particularly to an improved tire adapted for greater wear and having better road-holding properties.

Numerous improvements have been made in the construction of tires and tire treads to give maximum wear and traction under varying conditions. The importance of improved tire constructions becomes greater each year as the speed at which cars are driven increases. Years back 20 to 30 miles an hour was a fair speed. Today 60 to 80 miles an hour is quite common. Naturally the strains and stresses on tires at high speeds are much greater than at low speeds, and skids or blowouts are much more disastrous. Hence every effort must be made to give the best possible tire constructions which science can provide for modern cars.

The present types of tires generally comprise a series of layers of fabric to give strength to the tire and a heavy tread to give long wear. In order to give maximum traction and to prevent skidding, various tread constructions have been proposed and many of them patented. Tests have shown that the life of the tire depends substantially on the tread construction. Likewise certain constructions hold to the road much better than others due to the speed of stretch of the rubber. This is an important property to prevent the wheels from spinning when a car is started quickly and to prevent skidding when a car is stopped suddenly. Both cause excessive wear on the tires.

An improper design may also tend to cause uneven wear with cavities and lumps in the tread, generally adjacent the edges of the tread. Even more important is the prevention of skidding in rainy or snowy weather, because such skidding endangers life and property. These various elements have to be weighed against each other in the design of a tire. Another important element is to keep the tire cool. Undue heating causes the rubber to have a tendency to devulcanize and thereby shortens its life.

The present invention aims to minimize or overcome the above objections by providing an improved tire in which the rubber is properly distributed to minimize heating, in which maximum cooling results from the normal operation of the tire, in which the wear surface gives maximum life and in which adequate and improved non-skid features are embodied without impairing the wearing properties of the tire. The invention also aims to provide a tire having a speed of stretch which permits instant conformation to innumerable thrusts coming from all directions.

An object of the present invention is to provide an improved tire or casing having greater wear and road-holding properties.

Another object of the invention is to provide improved means for preventing skidding.

Another object of the invention is to provide improved means for minimizing excessive heating of the tire.

Another object of the invention is to soften the shoulder of the tire, thereby to prevent undue heating.

Another object of the invention is to provide improved non-skid elements at the shoulder of the tire to minimize wear thereon and likewise to minimize excessive strains and excessive heating at that point.

A further object of the invention is to provide more even wear across the tread of the tire.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a fragmentary cross-sectional view of a tire;

Fig. 2 is a fragmentary plan view of a portion of the tread of the tire illustrating the preferred construction; and Fig. 3 is a fragmentary sectional view similar to Fig. 1, illustrating the action of the tire when lateral stress is applied to it in turning around a corner.

Referring again to the drawings, there is illustrated in Figs. 1 and 3 a casing or tire 1 having a fabric portion 2 embedded in the rubber, which usually comprises four, six or more layers of fabric. This fabric is sealed by the rubber from atmospheric and weather conditions and hence has a long life. A layer 4 of rubber of substantial thickness extends about the fabric to protect it and to provide additional strength. The tread 5 of the tire is formed with a substantial thickness of rubber to give extended life and long wear. In my improved tire, the features thus far described may conform to the usual practice.

In order to increase the life of the tire and to give it the advantages discussed at some length above, the tread portion in the preferred embodiment preferably comprises a central load-bearing zone or surface 6 of substantial width. Preferably also there are two additional load-bearing zones, 6a and 6b, and 6c and 6d, on each side of the middle load-bearing zone 6.

Intermediate these load-bearing zones there are provided narrow ribs 7 preferably about $\frac{1}{8}''$ in width, separated from the adjoining zones by narrower grooves or spaces 8, preferably about $\frac{1}{32}''$ in width. These ribs may be easily depressed due to their thinness and hence are not subject to excessive wear as they are protected by the adjoining zones. The ribs, therefore, do not wear down at a rate greater than the adjoining zones but remain flush with them to give improved road-holding properties.

The depth of the grooves and the lengths of the ribs will depend on the thickness of the tread. Generally the most beneficial results are obtained by having the grooves or ribs extend about two-thirds the depth of the tread; that is, through two-thirds of the thickness of the rubber measured from the outer layer of the fabric to the surface of the tread. While the dimensions in many cases will vary, preferably the depth of the grooves is substantially $\frac{7}{16}''$ and the thickness of the rubber between the bottoms of the grooves and the fabric at the middle of the tire is about $\frac{7}{32}''$. These proportions will give excellent results but the invention is not to be considered lmited in its broader aspects to those measurements which are given herein for illustrative purposes.

It is to be noted in the preferred embodiment that both the load-bearing surfaces 6 and the ribs 7 and grooves 8 are straight. It will also be noted that the tread of the tire is rounded so that the major part of the load will be borne on the middle portion of the tire and on the load-bearing surfaces 6 to 6d. At each edge of the tread there is provided an additional load-bearing surface 9 on one side and 10 on the other. These load-bearing surfaces at the edges of the tread will not be subjected to the same intense load to which the middle load-bearing surfaces 6 to 6d are subjected, by reason of the rounded surface of the tire. Therefore, these surfaces will not be subjected to the same degree of wear. On the other hand, when the car is being turned at high speeds and when there is a tendency for the car to skid, severe loads will be applied to those edges.

In the preferred embodiment, these edge zones 9 and 10 are preferably separated from their adjoining load-bearing zones 6b and 6d by a plurality of ribs, illustrated as two in the preferred embodiment and numbered 11 and 12. Preferably also these ribs are slightly more narrow than the ribs 7. The ribs 11 and 12 with a width of about $\frac{3}{32}''$ will give excellent results. The ribs 11 and 12 are separated from each other and from the adjoining load-bearing surfaces by narrow grooves 8a, preferably having a dimensional width similar to the grooves 8. While certain advantages may be obtained with the ribs 11 and 12 straight, much greater advantages will be obtained by their being wavy in a lateral direction as illustrated at 14. The wavy construction gives greater traction at the edge of the tread and hence greater road-holding properties when there is a tendency to skid. Likewise in going over a wet roadbed or snow, these wavy surfaces tend to hold to the road much better than the straight surfaces.

On the other hand, these wavy portions would wear much more rapidly than the other tread portions if subjected to the same amount of wear. However, since the tire is rounded, these edge portions have less load on them than the middle portions. Hence the greatest wear is applied to those zones which are most capable of withstanding it and the least wear to those zones which are least able to stand it. At the same time, an extraordinary amount of non-skid properties is available in emergencies.

The tread at the edge thereof is much thicker than at the middle portion. This construction is more or less necessary because of the rounded inner part. On the other hand, the thicker the rubber the more heating results from impacts and the resulting bending. Further, the edge portion of the tread of the tire serves more or less as a hinge between the tread and the wall of the tire and is subjected to more bending than the rest. For this reason the rubber at that portion is heated up to a much greater extent than the rubber at the middle portion. By providing a plurality of ribs 11 and 12 at this hinge portion, the shoulder is rendered more flexible which improves substantially the operation of the tire. The edges of the ribs remain sharp throughout the life of the tire since the ribs are flexible and easily depressible except when supported by the adjoining load-bearing zones. The ribs cooperate with each other and with the adjoining load-bearing surfaces to hold to the road in emergencies. These ribs will be squeezed together as shown more particularly in Fig. 3 and will stretch when the tire is tending to skid and will hold to the road much more effectively than the relatively wide load-bearing surfaces 6 with the single intermediate ribs 7.

The deep grooves at the edge of the tire likewise pump cooling air into the interior of the rubber as the tire passes over the roadbed. In this way the hinged portion of the tire at the edge thereof is cooled. Cooling at the middle portion of the tire is not as essential but the grooves 8 therein assist in this particular also.

In operation the middle load-carrying zones 6 to 6d carry the major part of the load and are subjected to the most wear. Wear on this portion of the tread is minimized by both the zones and the intermediate ribs being straight. In addition, the spaces 8 intermediate the ribs and zones are sufficiently narrow that they are substantially closed from bottom to top each time they pass over the roadbed. This forces the air out and draws new air back in, thereby cooling the tread. In addition, the mass of rubber which has to move is reduced and made more flexible, thereby further minimizing undue heating.

The wavy ribs and the wavy sides on the adjoining load-carrying zones at the sides of the tread give greater traction but will wear faster when subjected to the same amount of abuse. However, these portions of the tread carry less of the load proportionately than the middle sections of the tread. Thus these portions are not subject to as much wear and hence the fact that they will wear faster is not troublesome. These portions will last as long and probably longer than the middle of the tread in spite of this. The plurality of ribs separated by grooves or voids soften the shoulder of the tire so that it will flex better. In addition, they break up the mass of rubber at the shoulder so that less rubber has to move under impact. Even more important, the plurality of ribs being compressed between the adjoining load zones form a very effective grip on the road under emergency conditions. In addition, when the car or truck is operated in rainy or snowy weather, the wavy tread at the sides tends to cause the wheels to go straight forward and minimizes any tendency to skid. In going through snow and mud the wavy ribs hold to the road.

It will be seen that the present invention provides an improved tire or casing with unusual and extraordinary advantages. The wear surface of the tread is constructed for maximum wear and the edge portions of the tread for maximum traction and maximum non-skid properties. In addition, the construction at the edge of the tread softens the shoulder of the tire and minimizes heating resulting from the bending at these points. The deep narrow grooves circulate air throughout the tread and particularly at the shoulders of the tire, which heat most. The plurality of ribs at the edges of the tread are squeezed between the adjoining load zones and form a very effective squeegee which has unusual and extraordinary holding power. The tread of the tire retains substantially its original shape and characteristics throughout its life. The tire is simple and rugged in construction and fully capable of withstanding the rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a pneumatic tire of the class described, the combination of a casing having a fabric portion and a surrounding rubber portion, said rubber portion having a tread for contacting the roadbed, said tread having a plurality of annular zones of substantial width at the inner portion thereof, each of said zones having annularly straight side walls of substantial depth substantially normal to the surface of said tread and said zones being transversely spaced from each other, a zone of substantial width adjacent each outer edge of said tread, each of said outer edge zones being separated from its adjoining inner zone by a plurality of ribs, said ribs being separated from each other a distance substantially equal to one-third the width of the ribs and being sinusoidal in a lateral direction to give increased traction between their surfaces and the road bed, said sinusoidal ribs having their outer surfaces flush with the surface of the tread.

2. In a pneumatic tire of the class described, the combination of a casing having a fabric portion and a surrounding rubber portion, said rubber portion having a tread for contacting the roadbed, said tread having a plurality of relatively wide annular zones at the inner portion thereof, each of said zones having annularly straight side walls of substantial depth substantially normal to the surface of the tread, annular ribs separating adjoining inner zones from each other, said ribs having their surfaces flush with the surface of the tread and having annularly straight side walls of substantial depth substantially normal to the surface of the tread, a zone of substantial width adjacent each outer edge of the tread, and a plurality of laterally spaced relatively narrow serpentine ribs having their outer surfaces substantially flush with the outer surface of the tread intermediate each of said outer edge zones and its adjoining inner zone for separating the two and for increasing the traction action of the tread adjacent the outer edges.

3. A tire as claimed in claim 2, in which the space between adjacent relatively narrow serpentine ribs is substantially equal to the space between one of said ribs and an adjoining outer edge zone and to the space between another of said ribs and an adjoining inner zone.

4. A tire as claimed in claim 2, in which said annular separating ribs are about one-third the width of said relatively wide annular inner zones.

5. A tire as claimed in claim 2, in which each of the annular ribs which separate adjoining inner zones from each other is wider than any one of said plurality of serpentine ribs.

6. A tire as claimed in claim 1, in which the depth of said straight side walls is about two-thirds the depth of the rubber portion.

7. A tire as claimed in claim 1, in which said plurality of ribs comprises a pair of ribs.

8. A tire as claimed in claim 1, in which each rib of said plurality of sinusoidal ribs has a width less than the distance by which said side walls of the adjoining inner zones are transversely spaced from each other.

MAX C. OVERMAN.

REFERENCES CITED

The following references are of record in the file of this patent:

UNITED STATES PATENTS

| Number | Name | Date |
| --- | --- | --- |
| 2,048,635 | Kraft | July 21, 1936 |
| 2,186,178 | Shoemaker | Jan. 9, 1940 |
| 2,260,193 | Overman | Oct. 21, 1941 |
| 2,294,626 | Overman | Sept. 1, 1942 |

FOREIGN PATENTS

| Number | Country | Date |
| --- | --- | --- |
| 418,820 | Great Britain | of 1934 |

OTHER REFERENCES

Tires, (Adv't) Page 31, July 1943.